(12) United States Patent
Eveland (10) Patent No.: US 9,248,531 B2
(45) Date of Patent: Feb. 2, 2016

(54) ANNEALING SYSTEM FOR CARTRIDGE CASINGS

(71) Applicant: Vista Outdoor Operations LLC, Clearfield, UT (US)

(72) Inventor: James Eveland, La Mesa, CA (US)

(73) Assignee: VISTA OUTDOOR OPERATIONS LLC, Clearfield, UT (US)

( * ) Notice: Subject to any disclaimer, the term of this patent is extended or adjusted under 35 U.S.C. 154(b) by 0 days.

(21) Appl. No.: 14/265,015

(22) Filed: Apr. 29, 2014

(65) Prior Publication Data

US 2014/0318351 A1  Oct. 30, 2014

Related U.S. Application Data

(62) Division of application No. 13/439,579, filed on Apr. 4, 2012, now Pat. No. 8,707,844.

(51) Int. Cl.
| | |
|---|---|
| F42B 33/14 | (2006.01) |
| C21D 8/10 | (2006.01) |
| B21K 21/04 | (2006.01) |
| C21D 1/42 | (2006.01) |
| B23P 15/22 | (2006.01) |
| C21D 9/16 | (2006.01) |
| C21D 1/34 | (2006.01) |
| C21D 1/70 | (2006.01) |
| C21D 9/12 | (2006.01) |
| C21D 9/00 | (2006.01) |

(52) U.S. Cl.
CPC . *B23P 15/22* (2013.01); *C21D 1/34* (2013.01); *C21D 1/42* (2013.01); *C21D 1/70* (2013.01); *C21D 8/10* (2013.01); *C21D 9/0006* (2013.01); *C21D 9/12* (2013.01); *C21D 9/16* (2013.01); *F42B 33/14* (2013.01)

(58) Field of Classification Search
CPC ........ B21D 51/54; B21K 21/04; B23P 15/22; C21D 1/42; C21D 6/00; C21D 8/00; C21D 8/10
USPC .................. 86/19.5, 19.7; 148/631, 639, 656
See application file for complete search history.

(56) References Cited

U.S. PATENT DOCUMENTS

| | | |
|---|---|---|
| 446,532 A | 2/1891 | Maxim |
| 1,784,221 A | 12/1930 | Cain |
| 2,430,005 A | 11/1947 | Denneen et al. |
| 2,556,236 A | 6/1951 | Strickland, Jr. |
| 2,726,181 A | 12/1955 | Lyon |
| 3,090,276 A | 5/1963 | Corcoran |
| 3,593,775 A * | 7/1971 | Privott et al. .................. 164/513 |
| 3,706,118 A | 12/1972 | Hilton et al. |
| 3,984,259 A | 10/1976 | Rogers, Jr. et al. |
| 4,296,536 A | 10/1981 | Hicke |

(Continued)

FOREIGN PATENT DOCUMENTS

| | | |
|---|---|---|
| WO | WO 82/00424 A1 | 2/1982 |
| WO | WO 00/34732 A1 | 6/2000 |

*Primary Examiner* — Jonathan C Weber
(74) *Attorney, Agent, or Firm* — Christensen Fonder P.A.

(57) ABSTRACT

A portion of a work-hardened essentially tubular work piece such as a metallic firearm cartridge case is annealed by contact with solid or granular tooling material which has been heated to a temperature approximately that of the appropriate annealing temperature, thereby reducing the possibility of overheating the work piece, and also thereby permitting the annealing of only that portion of the work piece contacted or in close proximity to the point(s) of contact.

13 Claims, 6 Drawing Sheets

(56) References Cited

U.S. PATENT DOCUMENTS

| | | |
|---|---|---|
| 4,494,461 A | 1/1985 | Pryor et al. |
| 4,638,535 A | 1/1987 | Pryor et al. |
| 4,675,958 A | 6/1987 | Rosenbaum et al. |
| 2006/0016524 A1 | 1/2006 | Scharch |
| 2013/0005117 A1* | 1/2013 | Schmitt ........................ 438/478 |
| 2013/0032254 A1* | 2/2013 | Waniuk ......................... 148/538 |
| 2013/0180392 A1* | 7/2013 | Nuetzman et al. ............. 86/19.6 |

\* cited by examiner

ANNEALING SYSTEM FOR CARTRIDGE CASINGS

RELATED APPLICATIONS

This application is a divisional of U.S. patent application Ser. No. 13/439,579, filed on Apr. 4, 2012 issued as U.S. Pat. No. 8,707,844 on Apr. 29, 2014, of which is incorporated herein in its entirety by reference.

FIELD OF THE INVENTION

The present invention is generally related to the field of annealing of work hardened cartridge casings. More specifically, the present invention is directed to annealing a cartridge casing by applying heat conductively to the casing.

BACKGROUND OF THE INVENTION

Metals, such as copper and tin alloys, can become increasingly hard and inflexible due to stress introduced into the metal from physically shaping of the metal from bending, stamping, coining, punching, flattening, extruding, hammering, stretching and other conventional means of shaping metals. "Working hardening" from the shaping and reshaping of metals can result in metal fatigue ultimately resulting in failure of the metal.

Work hardening is concern in the production and in particular the reloading and reuse of metal cartridge casings. A cartridge casing typically comprises a tubular casing having a closed end and an open end in which the bullet is seated. The metal surrounding the open "mouth" end of the casing must be sufficiently flexible such that mouth can be crimped against the bullet. The mouth must also flex outwardly during firing to seal against the chamber walls of the firearm to create a pressure tight seal for propelling the bullet. The shaping process for forming the tubular casing can harden the metal around the mouth preventing the mouth from properly flexing during loading or firing. In addition, many high power cartridges are necked such that the diameter of the mouth is reduced to less than the diameter of the closed "head" end of casing. The necking process can further harden the mouth of the casing.

The flexing of the mouth and the rest of the casing during firing can also cause work hardening of the casing. As a result, casings that are recovered after firing and reloaded with a new bullet are typically harder than new casings. Moreover, the reloading process typically involves mechanical reshaping and re-crimping of the cartridge casing further hardening the cartridge casing. Similarly, spent cartridges are often reshaped to fit firearms that the cartridge was not originally manufactured to fit. In addition to being performed by individuals with little or no formal training, these reloaded or repurposed "wildcat" cartridges are largely unregulated for safety and effectiveness.

Work hardening of the casing caused by initial manufacture and reloading can harden the mouth of the casing until the casing cannot flex to seal against the projectile or the chamber walls. A work hardened casing could fracture, rupture or otherwise mechanically fail, potentially causing injury to the shooter and/or damaging the firearm.

Annealing is a common technique for counteracting the affects of work hardening that involves softening the metal by heating the metal into critical temperature range at which the stress caused by the shaping of the metal is released. The casing is then cooled with air or water. The casing must carefully be heated to a temperature sufficiently high enough to soften the metal for the stress to be released while less than a temperature where the metal becomes too soft and weaken the structural integrity of the casing.

A related concern is that the metal of the rest of the casing and in particular at the head of the casing is typically harder than the metal at the mouth of the casing. The harder metal at the rear of the casing is necessary to prevent rupturing of the casing during firing and to direct the propellant gases against the bullet and down the barrel of the firearm. The annealing process can apply heat to more of the casing then the mouth portion potentially weakening the rear of the casing. In addition, even if heat is only applied to the portion of the casing to be annealed, the heat can often migrate along the length of the casing even though direct heat was only applied to a portion of the casing.

A currently available technique for annealing the mouth portions of the casings comprises passing the mouth portion of the casing through at least one flame oriented to contact only the mouth portion. The casing is typically positioned on a moving structure such that the mouth of the casing remains in contact with the flame for a limited period of time to prevent heat migration throughout the casing. In addition to the inherent risk of having an opening flame in an ammunition loading area, a drawback of the approach is that the temperature of the flame is typically greater than the preferred annealing temperature creating a danger of overheating the mouth portion of the casing or causing rapid heat migration through the casing. Similarly, an open flame can heat the surrounding air causing convective heating of the casing including the head portion. In addition, flame size, shape, direction, closeness to the mouth portion, and heating time must all be exact to avoid either incomplete annealing or catastrophic case damage. These factors are commonly arrived at empirically, as it is obviously difficult to accurately measure the temperature of the cartridge case along its length in real-time under these conditions.

A related drawback is that a single flame will not evenly heat the case around its entire circumference, leading to uneven metal hardness in the area to be annealed. As a result, the cartridge are commonly rotated within the flame to apply the heat around the entire circumference of the casing. Certain currently available methods utilize multiple flames at different orientations or rotate the casing within the flame area to evenly heat the casing around the mouth portion. Both remedies significantly increase the complexity of the process and the likelihood of failure.

Other approaches to annealing only the mouth portions of the casing include dipping the casing into a molten solution, such as molten metal or chemical salts. However, these approaches typically leave solidified residue on the casing, which can render the case unusable or toxic depending on the molten material used. Similarly, the molten solution itself is often cost prohibitive and can produce toxic fumes. In addition, the solution often requires frequent regeneration or replacement and can often corrode the casing.

Other even less satisfactory annealing processes have been tried, including dipping the cartridge case into molten metal such as lead, or into molten chemical salts intended for specialized heat-treatment and surface-preparation of metals. In the former example, the molten metal tends to wet the surface of the cartridge case brass, leaving behind a solidified residue which makes the case unusable. In the latter example, the salts are usually highly toxic, via either skin contact or the breathing of heated fumes, or both; and many such salts have proven corrosive to the brass cartridge case material. Further, such salts are expensive and have a limited useful life, requiring frequent regeneration or replacement.

As the currently available annealing processes are often dangerous and difficult to control or repeat, there is a need for an effective means of annealing the mouth portions of casing.

SUMMARY OF THE INVENTION

The present invention is directed an annealing system and related method of using that anneals the cartridge casing primarily through conductive heat transfer. The annealing system generally comprises a heat transfer element that directly contacts the mouth portion of the casing to transfer heat directly to the portion of the casing to be annealed. The heat transfer through conduction is more rapid and efficient than through convection or other heat transfer means. As such, the heat transfer element can be maintained at a temperature proximate to the effective annealing temperature for the metal used in the casing lowering the likelihood of overheating the casing or avoiding heating more of the casing then intended. In one aspect, the heat transfer element can be pre-formed to match the shape of the portion of the casing to be annealed in order to maximize contact between the heat transfer element and the casing to maximize the heat transfer from the heat transfer element to the casing. In another aspect, the heat transfer element can comprise a plurality of shape adapting structures that move or flex to conform to the shape of the casing to maximize contact between the heat transfer element and the casing.

In an embodiment of the present invention, an annealing system can comprises a heating element and a heat transfer element comprising a plurality of shape adapting structures, wherein the shape adapting structures comprise plurality of granules. The granules can comprise metal shot, ceramic beads, sand or other packable spherical elements capable of being heated to the annealing temperature. The granules can be positioned in a bath and heated by the heating element to a temperature proximate to the annealing temperature. The mouth portion of the casing can be inserted into the bath to anneal the mouth portion. The granules can be sized and/or loosely packed such that the granules can move to conform to the shape of the mouth portion and conductively transfer heat around the circumference of the mouth portion.

In another embodiment of the present invention, the shape adapting structures can comprise a plurality of fingers. The fingers are heated by the heating element and can be arranged in a generally tubular configuration for receiving the mouth portion of the casing between the fingers. In this configuration, the fingers cooperate to contact the mouth portion around the entire circumference of the mouth portion. The fingers can flex to conform to the shape of the casing to maximize contact between the fingers and the casing.

In yet another embodiment of the present invention, the heat transfer element can comprise a conductive block defining an axial cavity for receiving the mouth portion of the casing. The axial cavity can be pre-formed to match the shape of the casing so as to provide continuous heat around the circumference of the casing.

In one aspect, the heating element can be sized to directly contact the entire portion of the casing to be annealed maximizing the rate of heat transfer into the portion to be annealed. As the heating transfer to the casing is primarily conductive, the risk of inadvertently heating the head portion of the casing is lessened. Moreover, as only the mouth portion is directly heated, the heat transfer through the casing toward the head portion can be more accurately controlled.

A method of annealing a mouth portion of a cartridge casing, according to an embodiment of the present invention, can comprise providing a heat transfer element conformable to the mouth portion of the cartridge casing. The method can further comprise heating the heat transfer element to a predetermined temperature. The method can also comprise inserting the mouth portion of the cartridge casing into the heat transfer element such that the heat transfer element contacts the casing around the circumference of the mouth portion. The method can further comprise transferring heat through the heat transfer element into the mouth portion of the cartridge casing for a predetermined period of time. Finally, the method can comprise removing the mouth portion of the casing from the heat transfer element and cooling the casing.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE DRAWINGS

The invention can be completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Figure 1:
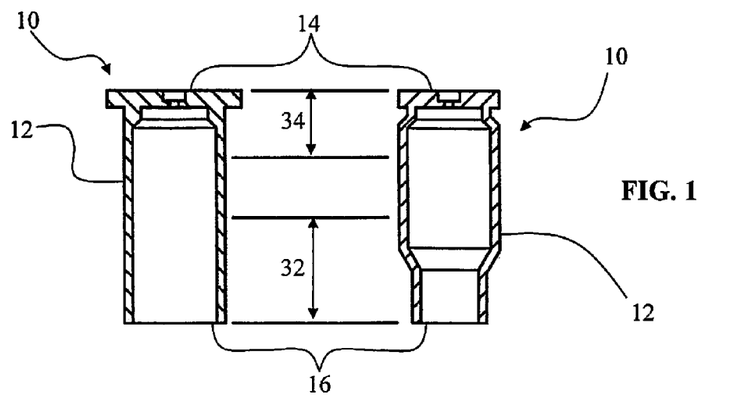
FIG. 1 is a cross-sectional side view of a two typical metallic firearm cartridge casings useable with the present invention.

As shown in FIG. 1, a conventional cartridge casing 10 generally comprises a tubular casing 12 having a closed "head" end 14 and an open "mouth" end 16. The casing 10 can further comprise a necked portion 18 such that the diameter of the mouth end 16 of the tubular casing 12 is less than the diameter of the head end 14. The cartridge casing 10 can comprise a metal such as a copper, brass, tin, aluminum and other metals and alloys used to form cartridge casings 10. Similarly, the casing 10 can comprise any conventional ammunition size. The general description of the casing 10 is not intended to be limiting, but to assist in the description of the present invention.

Figure 2:
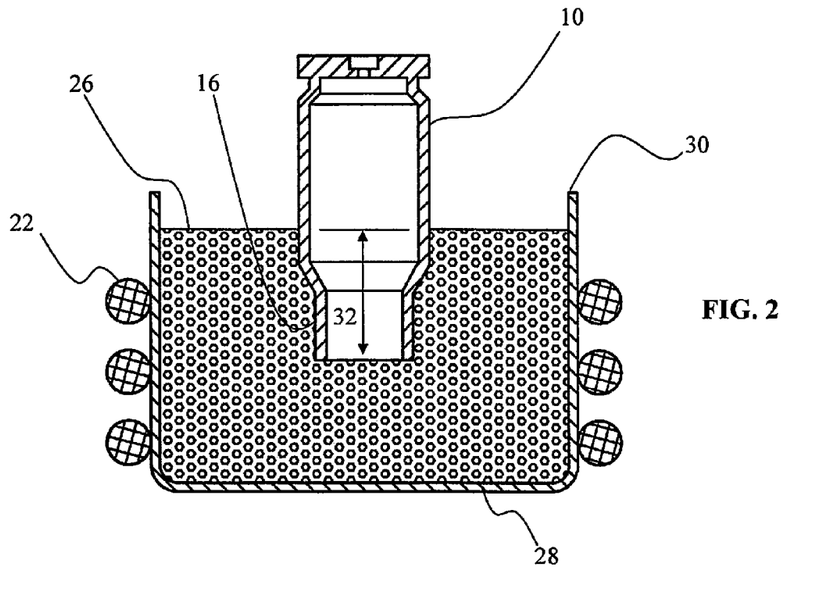
FIG. 2 is a cross-sectional side view of an annealing system having a heat transfer element comprising a quantity of granular material, according to an embodiment of the present invention.
Figure 5:
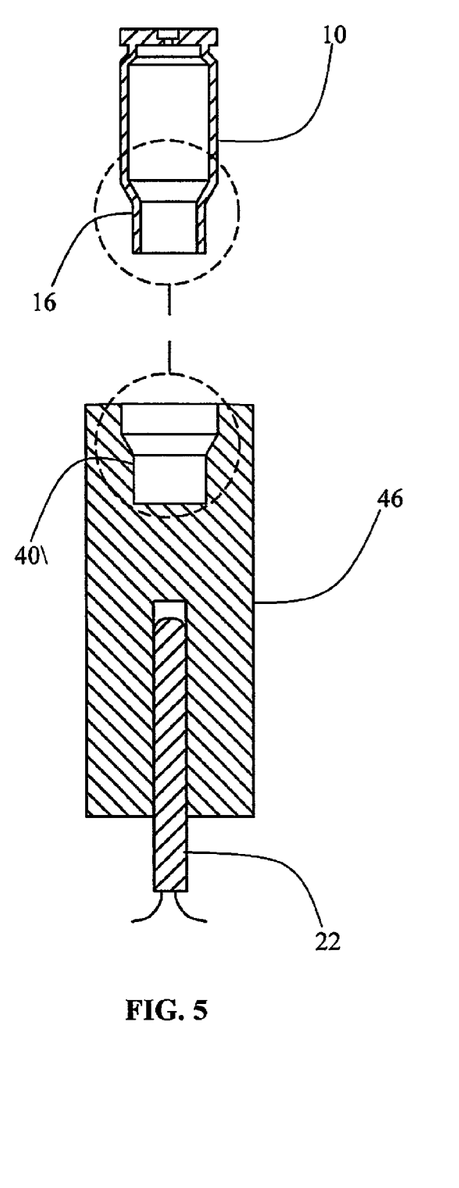
FIG. 5 is a cross-sectional side view of an annealing system having a heat transfer element comprising a conductive block with a pre-formed cavity, according to an embodiment of the present invention.
Figure 6:
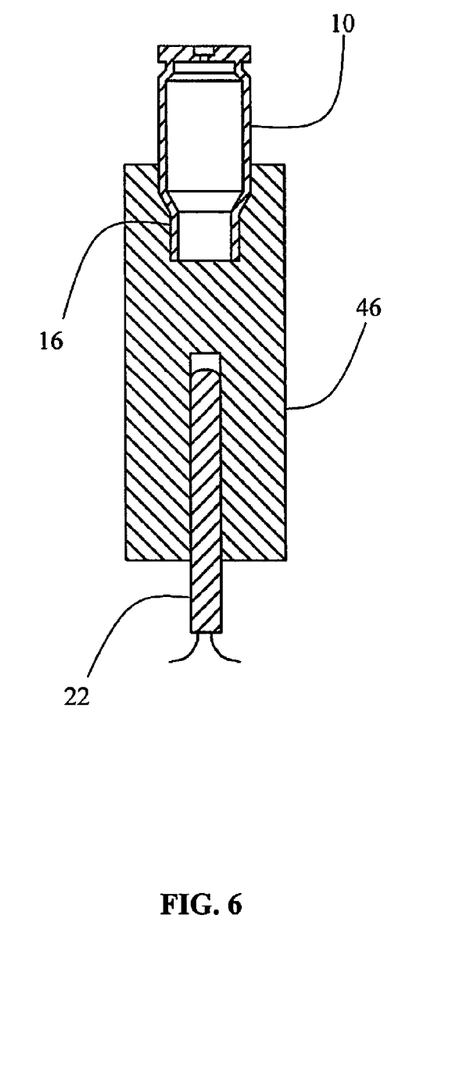
FIG. 6 is a cross-sectional side view of the annealing system depicted in FIG. 5, wherein a cartridge casing is inserted into the pre-formed cavity.
Figure 7:
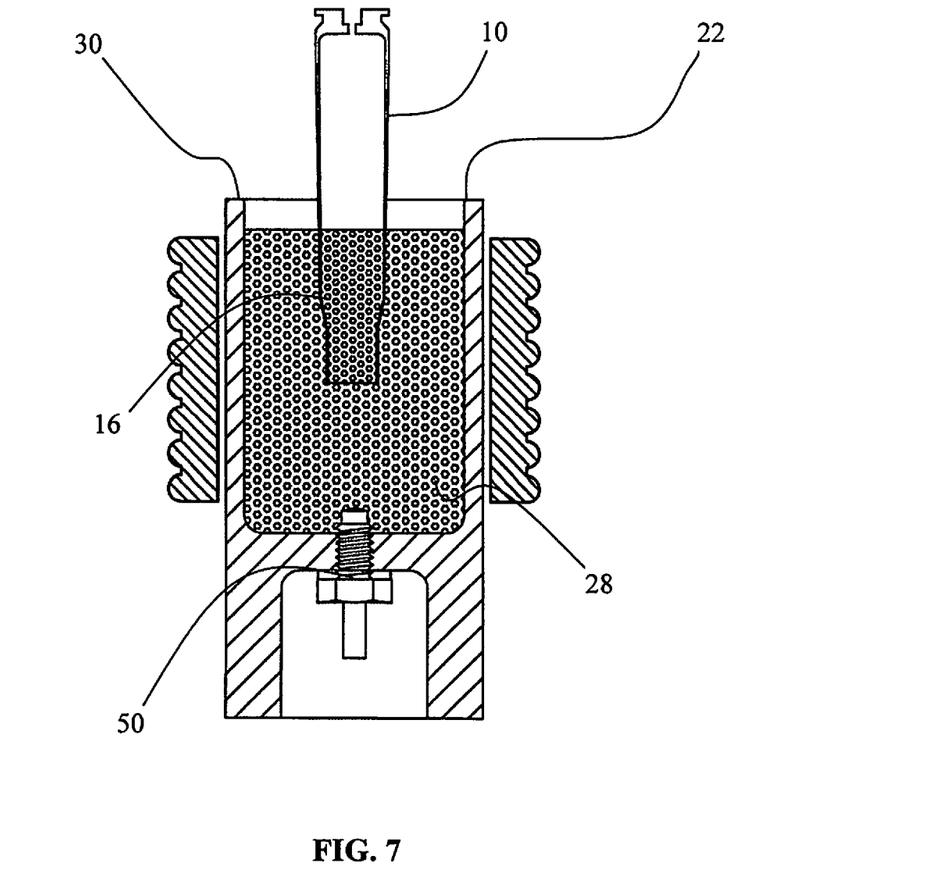
FIG. 7 is a cross-sectional side view of an annealing system having a heat transfer element comprising a quantity of granular material, according to an embodiment of the present invention.
Figure 8:
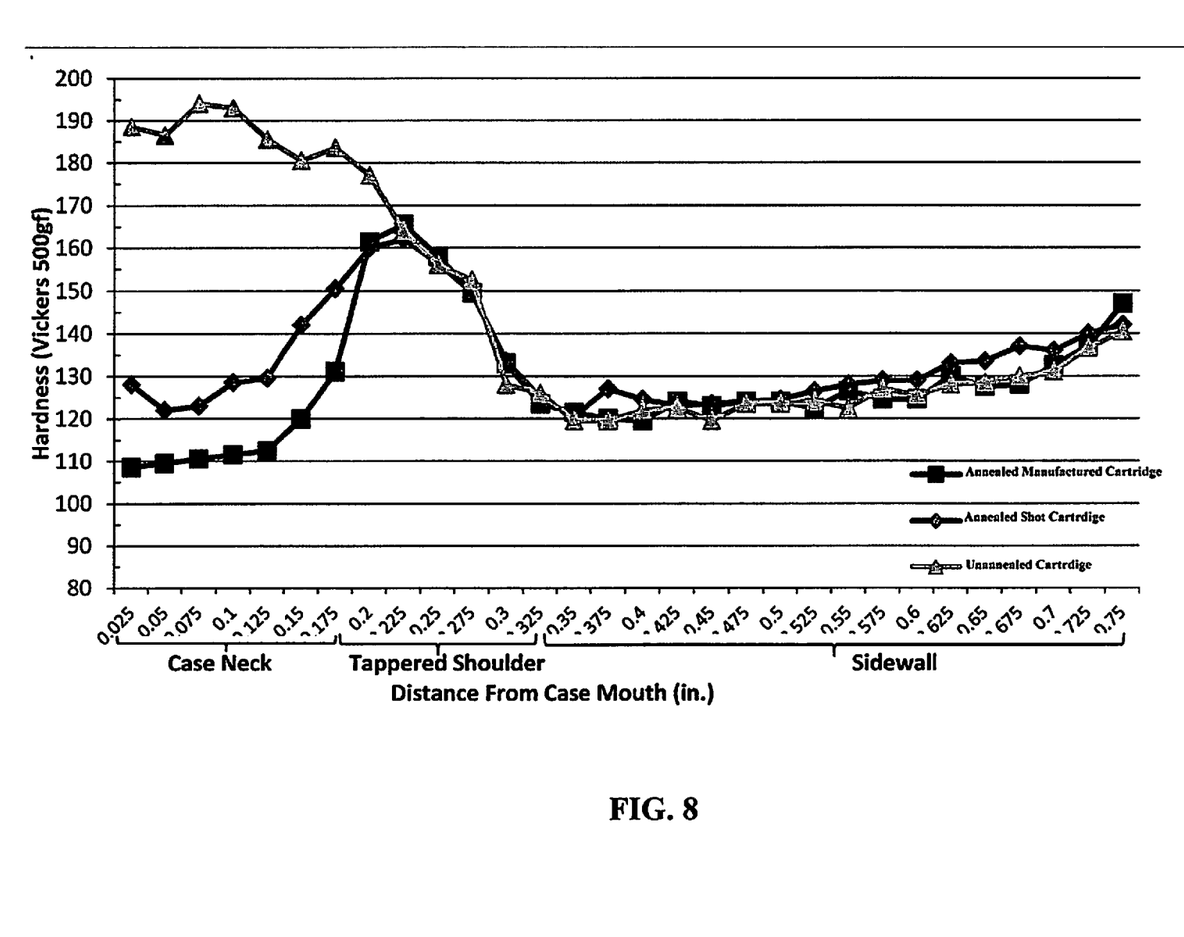
FIG. 8 is a representative chart illustrating the differences in hardness across a manufactured then annealed cartridge casing, a shot then annealed cartridge casing, an un-annealed cartridge casing, according to an embodiment of the present invention.

As shown in FIGS. 2-7, an annealing system 20, according to an embodiment of the present invention, can comprise a heating element 22 and a heat transfer element 24. The heating element 22 can comprise a coil shape, as shown in FIG. 2, an elongated shape, as shown in FIGS. 3-6, a ring shape, as shown in FIG. 7 or other conventional heating element. In one aspect, the heating element 22 can comprise a conventional resistive heating element.

The heating element 22 is adapted to heat the heat transfer element 24 to within a predetermined temperature range corresponding to the annealing temperature of the metal used for the casing 10. In one aspect, the heating element 22 can heat the heat transfer element 24 to a temperature between 400 to 800° F. for brass casings 10.

The heat transfer element 24 is adapted to transfer heat conductively to any portion of the casing 10 contacting the transfer element 24. In one aspect, the heat transfer element 24 needs only remain in contact with the casing 10 until the casing 10 is heated through the wall of the tubular casing 12 as the residual heat in the casing 10 will anneal the remaining portions of the casing 10 to be annealed. In one aspect, the casing 10 is maintained in contact with the heat transfer element 24 for about 3 seconds.

As shown in FIGS. 2 and 7, the heat transfer element 24 can comprise a plurality of granules 26 and a container 28. The granules 26 can comprise metal, ceramic, quartz sand, granite, silica, or other conventional heat transfer elements that can be formed into small grains. In one aspect, diameter of the granules 26 can be between 0.010 and 0.015 inches. In this configuration, the granules 26 can form a free flowing media that can quickly conform to the shape of the casing 10 when inserted into the granules 26 or fill in any holes left when the casing 10 is removed. Similarly, the granules 26 are sized to have improved thermal transmissivity to reduce formation of hotspots.

As depicted in FIGS. 2 and 7, the container 28 comprises a circular cup shape for retaining the granules 26, but can comprise any conventional shape capable of retaining the granules 26. The container 28 also defines an opening 30 in the top of the container 28 through which the casing 10 can be inserted. In one aspect, the container 28 can further comprise a lid 30 for more efficient heating of the granules 26.

Figure 9:
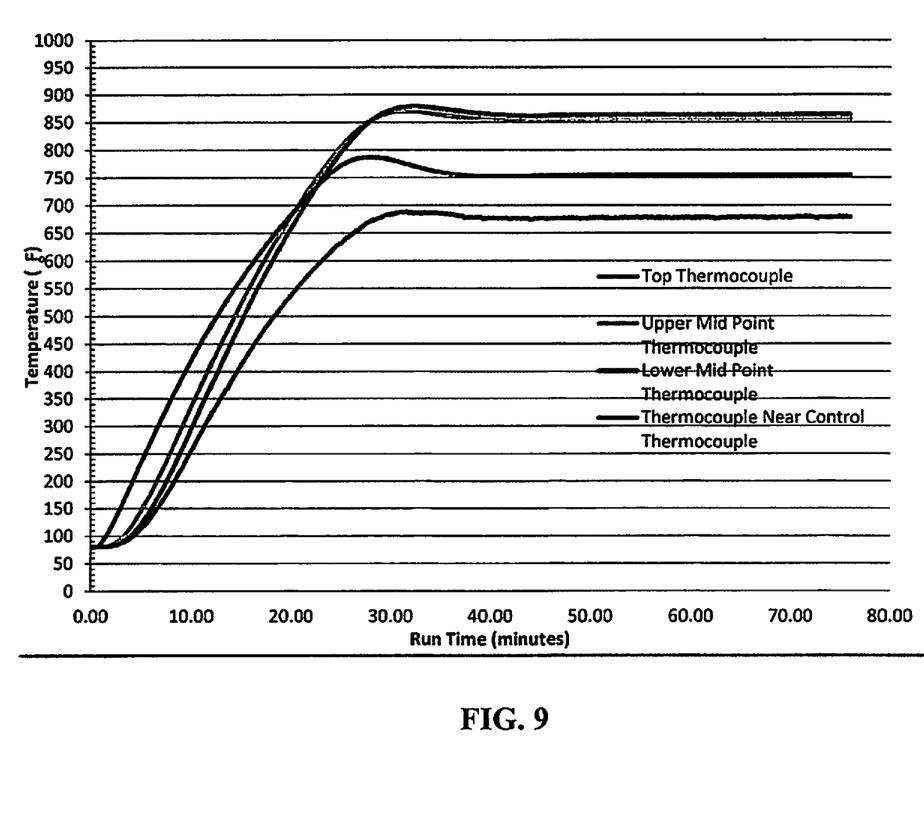
FIG. 9 is a representative chart illustrating the temperature gradient across a heating element, according to an embodiment of the present invention.

The container 28 can comprise a heat conductive material including, but not limited to, lead, iron, titanium or aluminum. As shown in FIGS. 2 and 7, in one aspect, the heating element 22 can be wrapped around the exterior of the container 28 to evenly heat the granules 26 within the container 28. In another aspect, the heating element 22 can be inserted into the container 28 to heat the granules 26 directly. As shown in FIG. 9, in one aspect, the temperature gradient can be formed in the granules 26 wherein the coolest portion of the granules 26 is proximate the opening 30 and the hottest portion of the granules 26 is near the center of the container 28. In this configuration, the hottest portion of the granules 26 will be proximate to the mouth portion 16 of the casing 10 when the casing 10 is inserted into the granules 26 while the coolest portion of the granules 26 will be proximate to the head portion 14 of the casing 10.

In operation, the mouth portion 16 of the casing 10 is inserted through the opening 30 and into the heated granules 26. The granules 26 are loosely packed such that the granules 26 can conform to the shape of the casing 10. The casing 10 is inserted to a predetermined depth 32 within the granules 26 corresponding to portion of the casing 10 to be annealed. A hardened portion 34 of the casing 10 corresponding to the portion of the casing 10 that must remain hardened is not inserted into the granules 26 and protrudes from the granules 26. After heating, the casing 10 is removed allowing the granules 26 to fill in the hole left by the casing 10. In one aspect, the casing 10 can be heated progressively as the mouth portion 16 of casing 10 is contacts the fingers 38. In this configuration, the mouth portion 16 of the casing 10 is first heated by the fingers 38 as soon as the mouth portion 16 contacts the fingers 38.

Figure 3:
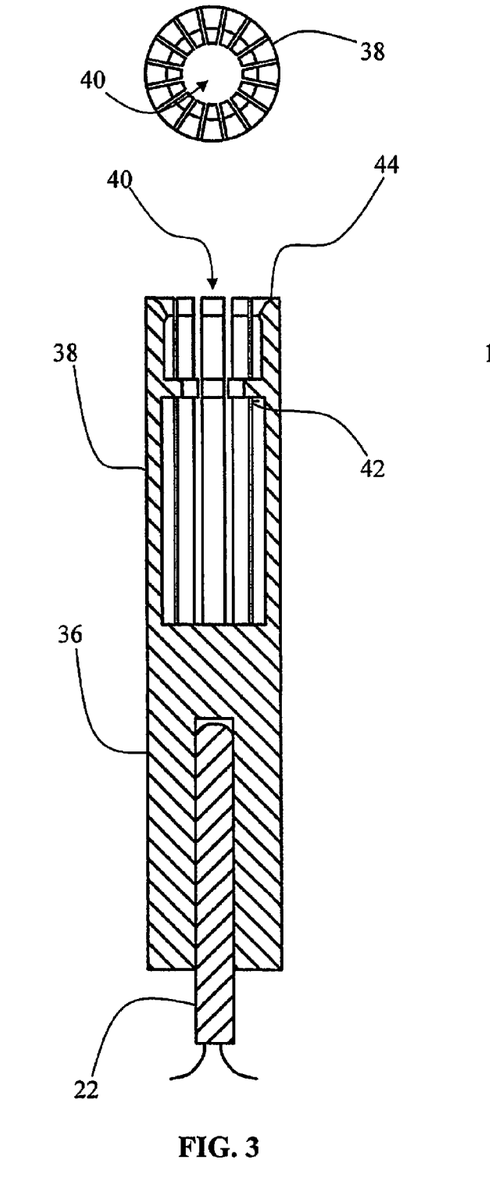
FIG. 3 is a cross-sectional side view of an annealing system having a heat transfer element comprising a plurality of flexible fingers, according to an embodiment of the present invention.
Figure 4:
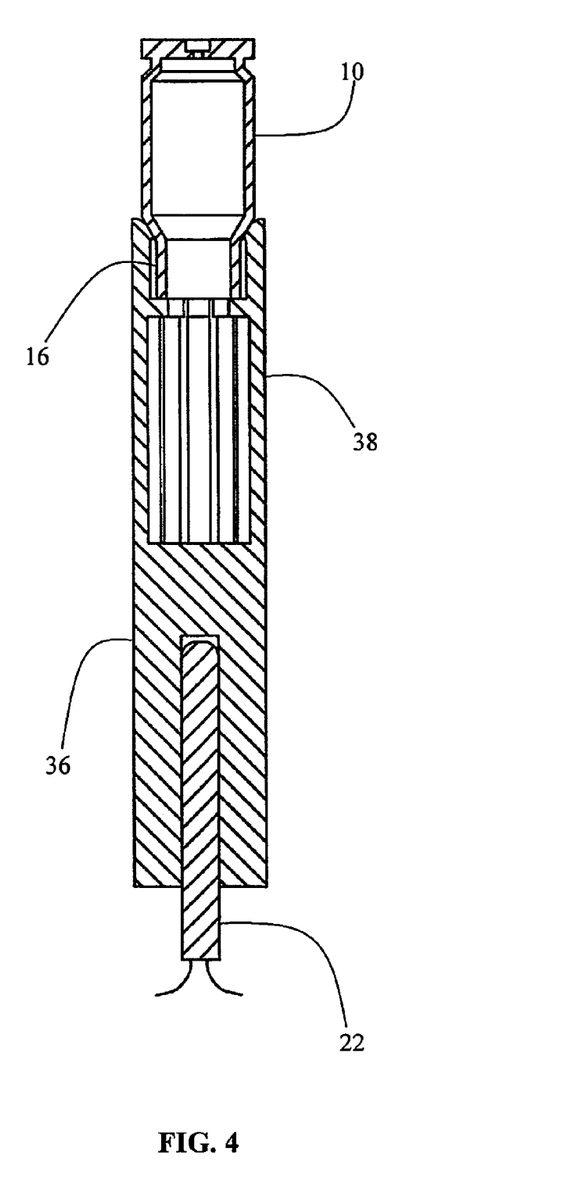
FIG. 4 is a cross-sectional side view of the annealing system depicted in FIG. 3, wherein a cartridge casing is inserted into a cavity defined by the plurality of flexible fingers.

As shown in FIGS. 3 and 4, the heat transfer element 24 can comprise a base 36 and a plurality of fingers 38 extending from the base 36. The fingers 38 are arranged in a tubular configuration to define a cavity 40 between the fingers 38 for receiving the mouth portion 16 of the casing 10. In one aspect, the base 36 and the fingers 38 can comprise a low-friction, heat conductive material including, but not limited to tungsten disulfide, tungsten carbide, boron nitride, molybdenum disulphide and other low-friction, heat conductive material or heat conductive material with a low friction coating. The heating element 22 can be inserted into or wrapped around the base 36, which transfers heat from the heating element 22 into the fingers 38. In one aspect, the heating element 22 can be arranged to create a temperature gradient in the fingers 38 in which the hottest portion of the fingers 38 is proximate to the base 36 while the coolest portion of the fingers 38 will be proximate the end of each finger 38 opposite the base. In this configuration, the hottest portion of the fingers 38 will be proximate to the mouth portion 16 of the casing 10 when the casing 10 is inserted into the fingers 38 while the coolest portion of the fingers 38 will be proximate to the head portion 14 of the casing 10.

In operation, the mouth end 16 of the casing 10 is inserted into the cavity 40 to the predetermined depth 32. The fingers 38 are adapted to flex to maintain contact with the casing 10 along the length of the casing 10 inserted into the cavity 40. The fingers 38 are arranged around the circumference of the cavity 40 to contact and heat the entire periphery of the casing 10.

In one aspect, each finger 38 can further comprise a protrusion 42 extending radially inward into the cavity 40. The protrusions 42 cooperate to engage the mouth end 16 of the casing 10 when the casing 10 is inserted to predetermined depth 32.

In another aspect, each FIG. 38 can further comprise an angled edge 44 for guiding the mouth end 16 of the casing 10 into the cavity 40.

As shown in FIGS. 5 and 6, the heat transfer element 24 can comprise a conductive block 46 defining a cavity 48 for receiving the mouth portion 16 of the casing 10. The cavity 48 can be pre-formed to correspond to the size and shape of the mouth portion 16 of the casing 10. In one aspect, the conductive block 46 can comprise a low-friction, heat conductive material including, but not limited to tungsten disulfide, tungsten carbide, boron nitride, molybdenum disulphide and other low-friction, heat conductive material or heat conductive material with a low friction coating. The heating element 22 can be inserted into or wrapped around the conductive block 46 to transfer heat through the block 46 into cavity 48. In one aspect, the heating element 22 can be arranged to create a temperature gradient in the cavity 48 in which the hottest portion of the cavity 48 is in the center of the conductive block 46 while the coolest portion of the cavity 40 will be proximate the opening in the block 46. In this configuration, the hottest portion of the cavity 48 will be proximate to the mouth portion 16 of the casing 10 when the casing 10 is inserted into the cavity 48 while the coolest portion of the cavity 48 will be proximate to the head portion 14 of the casing 10.

In operation, the mouth end 16 of the casing 10 is inserted into the cavity 48. The cavity 40 is sized such that only the casing 10 can only be inserted into the cavity 48 up to the predetermined depth 32 while the hardened portion 34 of the casing 10 protrudes from the conductive block 46 and remains unheated. In one aspect, the casing 10 can be heated progressively as the mouth portion 16 of casing 10 is inserted into the cavity 48. In this configuration, the mouth portion 16 of the casing 10 is first heated by the conductive block 46 as soon as the mouth portion 16 enters the cavity 48.

As shown in FIG. 7, in one aspect, the heat transfer element 24 can further comprise a thermocouple 50 for monitoring the temperature of the heat transfer element 24. The measured temperature can be used to insure the temperature of the heat transfer element 24 does not exceed the threshold temperature of the metal of the casing 10 where the casing 10 becomes over-softened.

As shown in FIGS. 1-7, a method of annealing a mouth portion 16 of a cartridge casing 10, according to an embodiment of the present invention, can comprise providing a heat transfer element 24 conformable to the mouth portion 16 of the cartridge casing 10. In an embodiment, the heat transfer element 24 can be pre-formed to correspond to the mouth portion 16 of the casing 10. The method can further comprise heating the heat transfer element 24 with a heating element 22 to a predetermined temperature. The method can also comprise inserting the mouth portion 16 of the cartridge casing 10 into the heat transfer element to a predetermined depth 32 such that the heat transfer element 24 contacts the casing 10 around the periphery of the mouth portion 16. The method can further comprise transferring heat through the heat transfer element 24 into the mouth portion 16 of the cartridge casing 10 for a predetermined period of time. Finally, the method can comprise removing the mouth portion 16 of the casing 10 from the heat transfer element 24 and cooling the casing 10. In an embodiment, the casing 10 can be cooled with a liquid or air.

While the invention is amenable to various modifications and alternative forms, specifics thereof have been shown by way of example in the drawings and described in detail. It is understood, however, that the intention is not to limit the invention to the particular embodiments described. On the contrary, the intention is to cover all modifications, equivalents, and alternatives falling within the spirit and scope of the invention as defined by the appended claims.

The invention claimed is:

1. A system for annealing a portion of a cartridge casing having an open mouth end and a closed head end, the system comprising:
    a heat transfer element having a plurality of shape adapting structures movable to approximate the shape and diameter of the portion of the casing to be annealed such that the heat transfer element substantially contacts the entire exterior of the portion of the casing to be annealed; and
    a heating element contacting the heat transfer element to heat the heat transfer element to a predetermined temperature.

2. The system of claim 1, wherein the plurality of shape adapting structures comprise a plurality of heat conductive granules.

3. The system of claim 2, wherein the granules comprise at least one of metal shot, ceramic granules, quartz sand, granite granules, and silica granule.

4. The system of claim 2, wherein the granules have a diameter between 0.010 and 0.015 inches.

5. The system of claim 2, wherein the heat transfer element further comprises a container for receiving the granules, wherein the container defines an opening through which the portion of the casing to be annealed can be inserted into the granules.

6. The system of claim 5, wherein the container comprising at least one of iron, titanium and aluminum.

7. The system of claim 5, wherein the container further comprises a lid for covering the opening.

8. The system of claim 5, wherein the heating element is wrapped around the container to heat the granules.

9. The system of claim 1, wherein the plurality of shape adapting structures comprise a plurality of fingers extending from a base, wherein the fingers are arranged to define a cavity for receiving the portion of the casing to be annealed, wherein the fingers are adapted to flex radially to conform the fingers to the size and diameter of the casing.

10. The system of claim 9, wherein the fingers comprises at least one of tungsten disulfide, tungsten carbide, boron nitride, and molybdenum disulphide.

11. The system of claim 9, wherein the fingers each comprise a protrusion extending radially inward into the cavity to engage the mouth end of the cartridge casing such that a second portion of casing proximate the head end of the cartridge casing protrudes from the cavity when the portion to be annealed is inserted into the cavity.

12. The system of claim 9, wherein the fingers each comprise an angled end for guiding the mouth end of the cartridge casing into the cavity.

13. The system of claim 1, wherein the portion of the casing to be annealed is proximate to the mouth portion of the cartridge casing.

* * * * *